No. 843,261. PATENTED FEB. 5, 1907.
G. J. CONATY.
ELECTRIC TRAM CAR.
APPLICATION FILED JULY 6, 1904.
2 SHEETS—SHEET 1.
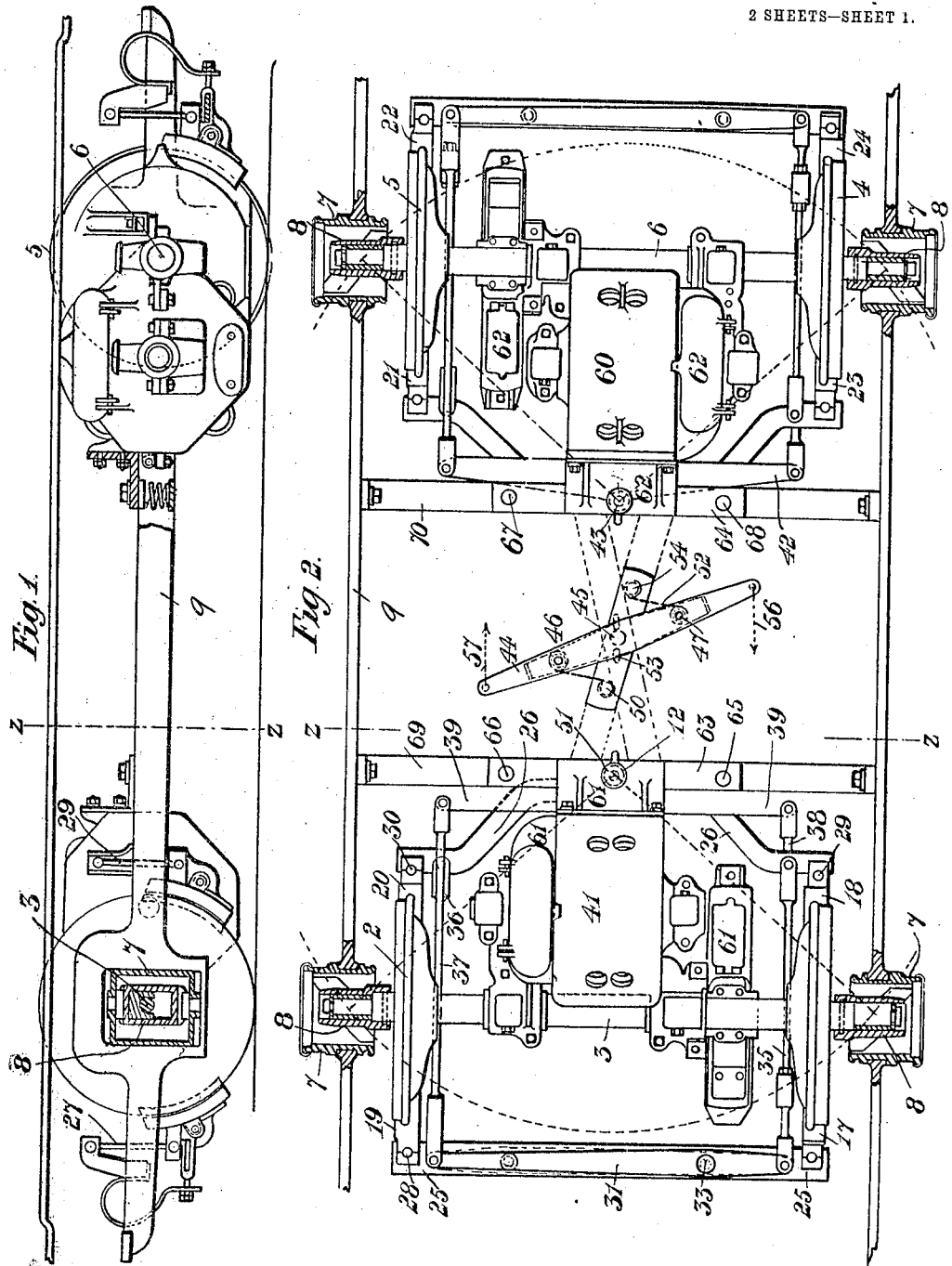
Witnesses
Charles Bosworth Kelley
Thomas John Rowe
Inventor
George John Conaty No. 843,261. PATENTED FEB. 5, 1907.
G. J. CONATY.
ELECTRIC TRAM CAR.
APPLICATION FILED JULY 6, 1904.

2 SHEETS—SHEET 2.

Witnesses
Charles Bosworth Kerley
Thomas John Rowe

Inventor
George John Conaty

UNITED STATES PATENT OFFICE.

GEORGE JOHN CONATY, OF SMETHWICK, ENGLAND.

ELECTRIC TRAM-CAR.

No. 843,261.　　　　Specification of Letters Patent.　　　　Patented Feb. 5, 1907.

Application filed July 6, 1904. Serial No. 215,549.

*To all whom it may concern:*

Be it known that I, GEORGE JOHN CONATY, a subject of His Majesty the King of Great Britain and Ireland, residing at 33 Bearwood road, Smethwick, in the county of Stafford, England, tramway company's manager, have invented certain new and useful Improvements in and Connected with Electric Tram-Cars, of which the following is a specification.
This invention consists of the herein-described improvements in and connected with electric tram-cars and is applicable to such as run on four wheels. According to this invention I so arrange the two axles of the car that they each have a movement radial to the track or curve. Moreover, I so arrange the electric motors which drive the axles that they have the same radial movement as the axles, and therefore drive equally well in whatever positions the axles may be.

It will be seen that my said invention enables a larger tram-car to be constructed with four wheels or with the two axles farther apart to prevent jumping of the car than is possible in the usual four-wheel construction, in which the two axles are arranged parallel with one another and have no radial movement, and, moreover, my construction insures easy running, and as the whole of the weight of the car and passengers is taken on the four driving-wheels greater adhesion of the wheel to the track is obtained than is the case in an eight-wheel bogie-car, in which only half the weight of the car and passengers is taken by the four driving-wheels.

I will describe this invention by referring to the accompanying drawings, on which—

Figure 4:
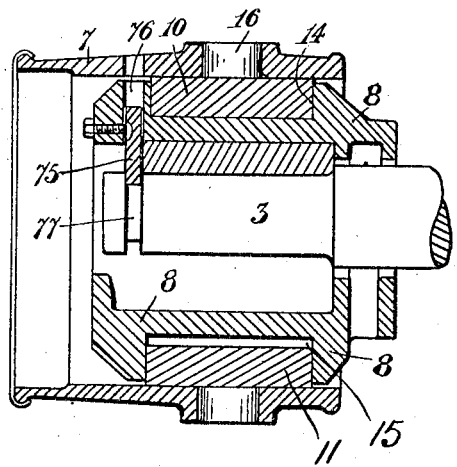
Figure 5:
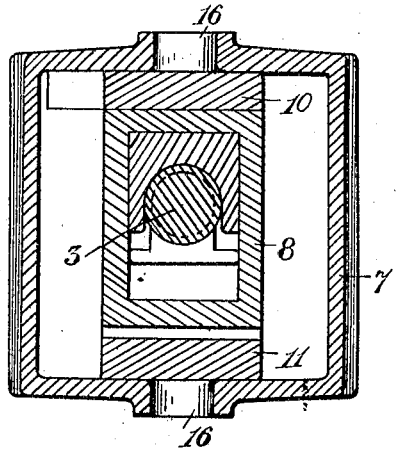
Figure 6:
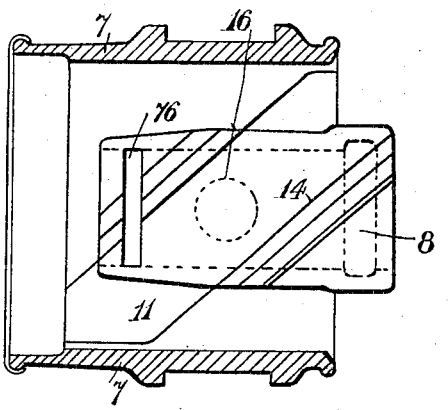
Figure 3:
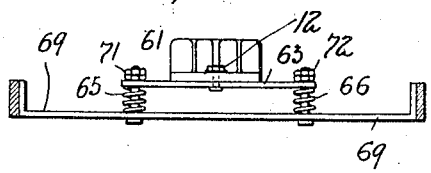

Figure 1 is a side elevation of the four-wheel truck of an electric tram-car with my invention applied. Fig. 2 is a plan of the same, partly in section. Fig. 3 is a cross-sectional elevation of parts of the truck on line Z Z of Figs. 1 and 2. Fig. 4 is a longitudinal sectional elevation of one of the axle-boxes of the said truck. Fig. 5 is a front sectional elevation of the same, and Fig. 6 is a sectional plan of the same.

The same reference-numerals indicate the same or corresponding parts in all the figures.
One of the axles, which has the two wheels 1 2 is marked 3, and the other axle, which has the two wheels 4 5, is marked 6. In order that these two axles may each have a movement radial to the track or curve, as aforesaid, each of the axle-boxes is constructed as follows: For simplicity I will describe one of the axle-boxes of the axle 3; but it will be understood that all the four axle-boxes are of the same construction. The axle-box consists of an outer box 7 and an inner box 8. The outer box 7 is capable of a vertical movement in the usual way in the guides in the side frame 9 of the truck and forms a support for the inner box 8, in which the axle 3 revolves, and this inner box 8 has a vertical movement with the outer box 7, but is also so arranged as to slide along curved guides 10 11 in the outer box 7, and these guides 10 11 form arcs of a circle, of which the center 12 is the center of the brake connections and which I call the "center" of the radial area. The center of the radial area of the other axle 6 is marked 13. These guides 10 11, together with the corresponding guides in the axle-box at the other end of the axle 3, thus allow of the axle having the said radial movement relatively to the track or curve. The outer box 7 is made considerably wider than the inner box 8, so as to permit of the aforesaid radial movement, and is provided with the curved guides 10 11 at the top and bottom, respectively, which, as shown, are made in the form of ribs engaging with corresponding grooves 14 15 in the top and bottom of the inner box 8. These guides 10 11 are, by preference, not rigidly formed with the outer axle-box 7; but each guide has a pivot 16, which takes into a corresponding vertical hole in the outer box, so that the guides can swivel slightly, if necessary. Thus the two axles 3 6, with their inner axle-boxes, can move along the curved guides in directions radial to the track or curve, as aforesaid.

In order that the electric motors 41 60, which drive, respectively, onto the two axles 3 6, may be unaffected by the radial movement of these axles, as aforesaid, and drive properly onto the axles in whatever positions the axles may be, the frames 61 62 of the motors are respectively pivoted over the centers 12 13 of the corresponding radial areas—that is to say, the frame 61 of the motor 41, which drives the axle 3 and which contains the usual bearings for that axle, is pivoted and turns about the center 12, which is the center of the radial area of the axle 3, and in the same way the frame 62 of the electric motor 60, which contains the usual bearings for the axle 6, is pivoted at the point 13, which is the center of the radial area of the axle 6, so that no matter in what positions the axles 3 6 may be relatively to the car the motors 41 60, with their frames 61 62, turn radially about the centers 12 13, respectively, with their corresponding axles 3 6, and the position of each motor relatively to the axle onto which it drives always remains the same.

In order to allow for any rocking of the car, the center pins 12 13, onto which the frames 61 62 of the motors are respectively pivoted, are fixed on short cross-bars 63 64, (see Fig. 6×,) which in their turn are by springs 65 66 67 68 carried by cross-bars 69 70, which are fixed to the side beams of the truck. The pins 71 72 connect the cross-bars 63 and 69 together, and the other pins similarly connect together the cross-bars 64 and 70, so as to allow of a certain rocking movement of the bars 63 64 and motor-frames 61 62 independently of the cross-bars 69 and 70, which are fixed to the truck-frame.

In each of the axle-bearings above described a key-plate 75 fits in a vertical slot 76 in the inner axle-box 8 and also in a groove 77 turned in the axle to prevent the axle from working endwise out of the bearing.

The accompanying drawings illustrate what I consider to be the best way of carrying my invention into practice; but it will be evident that my invention is not confined to the precise details shown, as these may be varied in some respects without departing from the nature of my invention.

What I claim as my invention, and desire to secure by Letters Patent, is—

1. A four-wheel electric tram car or truck having two pairs of bearing-boxes held against lateral and longitudinal movement, two radially-moving axles having their ends supported to have longitudinal movement in the bearing-boxes, an electric motor for driving each axle, casings for said motors, said casings being connected to and turning about the centers of the radial areas of the axles, and connecting the axles to said centers so that the motors have the same radial movement as the axles, substantially as described.

2. In a four-wheel electric tram car or truck, the combination with each of the radially-moving axles of two inner bearing-boxes 8 in which the ends of the axles revolve, guides in the truck, outer boxes 7 having vertical movement in said guides and radial guides pivoted in said boxes 7 on which the boxes 8 with the axles are adapted to move endwise, said radial guides being arranged to give the axles a movement radial to the track, substantially as described.

In witness whereof I have hereunto set my hand in presence of two witnesses.

GEORGE JOHN CONATY.

Witnesses:
 CHARLES BOSWORTH KETLEY,
 THOMAS JOHN ROWE.